United States Patent
Pfeifer et al.

(10) Patent No.: US 7,977,275 B2
(45) Date of Patent: Jul. 12, 2011

(54) CATALYTICALLY COATED PARTICLE FILTER AND METHOD FOR PRODUCING THE SAME AND ITS USE

(75) Inventors: Marcus Pfeifer, Solingen (DE); Markus Koegel, Speyer (DE); Roger Staab, Freigericht (DE); Pascal Adolph, Birstein (DE); Yvonne Demel, Frankfurt (DE); Tobias Kuhl, Hanau (DE); Egbert Lox, Grebenhain (DE); Thomas Kreuzer, Karben (DE); Frank-Walter Schuetze, Aschaffenburg (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 498 days.

(21) Appl. No.: 11/660,843

(22) PCT Filed: Aug. 13, 2005

(86) PCT No.: PCT/EP2005/008824
§ 371 (c)(1),
(2), (4) Date: Jul. 16, 2008

(87) PCT Pub. No.: WO2006/021337
PCT Pub. Date: Mar. 2, 2006

(65) Prior Publication Data
US 2009/0137386 A1 May 28, 2009

(30) Foreign Application Priority Data

Aug. 21, 2004 (DE) .......................... 10 2004 040 549

(51) Int. Cl.
*B01J 23/00* (2006.01)

(52) U.S. Cl. .................. 502/325; 502/333; 502/527.18; 502/178

(58) Field of Classification Search .......... 502/325–339, 502/178, 527.12, 527.13, 527.18, 527.19; 423/598, 600, 594.12, 335
See application file for complete search history.

(56) References Cited

U.S. PATENT DOCUMENTS

| 4,515,758 A | | 5/1985 | Domesle et al. |
| 4,522,941 A | * | 6/1985 | Heise et al. ................... 502/333 |
| 5,376,610 A | * | 12/1994 | Takahata et al. ............... 502/66 |
| 5,639,401 A | * | 6/1997 | Jacobs et al. .................. 252/373 |

(Continued)

FOREIGN PATENT DOCUMENTS

DE 19854794 5/2000

(Continued)

OTHER PUBLICATIONS

International Search Report (PCT/EP2005/008824).

(Continued)

*Primary Examiner* — Stuart Hendrickson
*Assistant Examiner* — Richard M Rump
(74) *Attorney, Agent, or Firm* — Kalow & Springut LLP; William D. Schmidt

(57) ABSTRACT

The invention proposes a particulate filter having a catalytic coating which contains two catalysts arranged one behind the other. The first catalyst is located in the gas inlet region of the filter and contains a palladium/platinum catalyst. The second catalyst is arranged downstream of the first catalyst and preferably contains platinum alone as catalytically active component. The combination of these two catalysts provides the coated filter with a good ageing stability and resistance to sulphur poisoning.

13 Claims, 2 Drawing Sheets

U.S. PATENT DOCUMENTS

| | | | |
|---|---|---|---|
| 5,989,507 A * | 11/1999 | Sung et al. | 423/213.5 |
| 6,172,000 B1 | 1/2001 | Chattha et al. | |
| 7,078,086 B2 * | 7/2006 | Hijikata | 428/116 |
| 7,094,728 B2 * | 8/2006 | Yan et al. | 502/300 |
| 2002/0074174 A1 * | 6/2002 | Dettling et al. | 180/68.1 |
| 2003/0021745 A1 | 1/2003 | Chen | |
| 2003/0083193 A1 * | 5/2003 | Takaya et al. | 502/304 |
| 2004/0001782 A1 * | 1/2004 | Kumar et al. | 422/180 |
| 2006/0057046 A1 * | 3/2006 | Punke et al. | 423/215.5 |

FOREIGN PATENT DOCUMENTS

| | | |
|---|---|---|
| EP | 0 160 482 A | 11/1985 |
| EP | 0 233 860 A | 8/1987 |
| EP | 0 626 188 A | 11/1994 |
| EP | 1 123 728 A | 8/2001 |
| JP | 2005009407 | 1/2005 |
| WO | WO03068394 * | 8/2003 |
| WO | WO 2004/047958 A | 6/2004 |
| WO | WO 2004/073856 A1 | 9/2004 |

OTHER PUBLICATIONS

Written opinion (PCT/EP2005/008824).

Notification of Transmittal of Copies of Translation of the International Preliminary Report (PCT/EP2005/008824).

* cited by examiner

CATALYTICALLY COATED PARTICLE FILTER AND METHOD FOR PRODUCING THE SAME AND ITS USE

FIELD OF THE INVENTION

The invention relates to a catalytically coated particulate filter and to a process for producing it and to its use for removing carbon monoxide, hydrocarbons and soot particles from the exhaust gas from an internal combustion engine, in particular a lean-burn gasoline engine or a diesel engine.

BACKGROUND OF THE INVENTION

Particulate filters are able to filter soot particles out of the lean exhaust gas from internal combustion engines and thereby to prevent the particles from being emitted into the atmosphere. Various types of filters can be used for this purpose, such as what are known as wall-flow filters, ceramic fibres or foams and filters formed from wire fabrics, which allow separation rates of up to 95% and above. However, the real difficulty is not that of filtering out the soot particles, but rather that of regenerating the filters which are used. Carbon soot only burns at temperatures of approximately 600° C. However, these temperatures are generally only reached in the full-load range by modern diesel engines. Consequently, additional booster measures are required to oxidize the soot particles that have been deposited in or on the filter. A distinction is drawn between active and passive measures: in the case of active measures, the temperature of the filter is raised to above the temperature required to oxidize the soot, for example by electrical heating. Measures of this type always entail increased fuel consumption. In the case of the passive systems, the soot ignition temperature is lowered, for example by the use of organometal fuel additives, such as ferrocene, or by catalytic coating of the filter. However, this reduction in the soot ignition temperature is not generally sufficient to ensure regeneration of the filter even at low load points, and consequently nowadays a combination of active and passive measures is generally used.

The combination of an oxidation catalyst with a particulate filter has proven particularly suitable. In this case, the oxidation catalyst is arranged upstream of the particulate filter in the exhaust system. An post-injection or other measures taken at the engine causes unburnt fuel and carbon monoxide to pass to the oxidation catalyst, where they are catalytically converted into carbon dioxide and water. The exhaust gas and therefore also the particulate filter arranged downstream are heated with the aid of the heat of reaction that is released. The post-injection quantity can be reduced by using a catalytic coating, which lowers the soot ignition temperature, on the filter or fuel additives, and the filter can then be regenerated at any engine operating point.

Recently, filters close to the engine, in which what is known as a pre-catalyst is integrated on the filter substrate, i.e. the coating of the pre-catalyst is applied direct to the particulate filter substrate, have also been incorporated in passenger cars. A filter of this type close to the engine has to have a correspondingly high oxidation potential in order to be able to guarantee that the statutory emission limits for hydrocarbons and CO are adhered to over the full life cycle. Furthermore, the filter has to be able throughout its entire service life to convert hydrocarbons which are post-injected during the regeneration, in order thereby to be able to provide the exothermal energy required to burn off the soot. On account of a filter of this type being fitted close to the engine, its catalytically active coating must be thermally stable.

Hitherto, it is virtually exclusively been filter coatings comprising platinum that have been used for diesel passenger cars. In principle, coatings based on platinum and palladium have also been the subject of discussion for some time. The latter coatings are distinguished by an excellent thermal stability but have a significantly lower fresh activity compared to coatings comprising platinum alone. A further drawback of catalytic coatings containing platinum and palladium is their high sensitivity to sulphur, which has hitherto prevented them from being used for diesel engines of passenger cars. Palladium is poisoned even when exposed to diesel exhaust gas containing sulphur dioxide for a relatively short period of time, which causes a corresponding loss of activity. On the other hand, this sulphur poisoning is reversible at high exhaust gas temperatures. This means that in the case of periodically regenerating systems, such as for example applications with diesel particulate filters, during regeneration of the filter the catalyst itself is "decontaminated" at the same time.

SUMMARY OF THE INVENTION

It is an object of the invention to provide a catalytically activated diesel particulate filter which has a high fresh activity, a good ageing stability and sulphur resistance with regard to the conversion of carbon monoxide and hydrocarbons.

This object is achieved by a catalytically coated particulate filter having a first end face and a second end face, which is characterized in that the particulate filter, starting from the first end face, is coated over a fraction of its length L with a first catalyst and then with a second catalyst, and the first catalyst contains platinum and palladium on first support materials, and the second catalyst contains platinum and if appropriate palladium on second support materials.

The catalytic coating of the particulate filter according to the invention therefore substantially comprises a platinum catalyst, which in a zone starting from an end face of the filter is additionally activated with palladium. When used in the vehicle, the filter is fitted in such a way that the end face of the filter which has additionally been activated with palladium faces the engine, i.e. forms the entry end face for the exhaust gases from the diesel engine. The particulate filter according to the invention therefore has an increased palladium concentration on the incoming flow side.

The filter according to the invention having its two catalyst coatings in succession on filter substrates formed, for example, from silicon carbide is particularly suitable for installation close to the engine. These filters have a high thermal mass and are therefore heated only slowly. Consequently, the light-off temperature of the catalyst located on the rear part of the filter is generally not reached over all the phases of the statutory test cycles, such as for example the NEDC (New European Driving Cycle). This applies in particular in the case of long filters with lengths of over 15 cm. This means that the catalyst makes little or no contribution to the conversion of hydrocarbons and carbon monoxide in the test cycle over this part of the filters. The filter according to the invention alleviates this problem by providing an increased precious metal concentration in the entry region of the filter.

It has now been found that a combination of catalysts arranged in succession with different palladium/platinum ratios have particularly favourable properties in terms of ageing and sulphur poisoning. Pure platinum catalysts are distinguished by a good fresh activity and a good sulphur resistance, but on the other hand the ageing stability of pure platinum catalysts is not particularly good. Therefore, a catalyst of this type is particularly suitable for the downstream part of the particulate filter.

The ageing stability of platinum can be improved by a combination of platinum with palladium. On the other hand, palladium is more susceptible to sulphur poisoning. Arranging the palladium in the entry region of the filter causes the coating to acquire a good resistance to the high thermal loads in this region. The greater susceptibility of palladium to sulphur poisoning is of no importance here, since in this region the temperature of the exhaust gas exceeds the de-sulphating temperature from time to time, in particular during the periodic regeneration of the soot filter.

Overall, the combination of a palladium/platinum catalyst in the inlet region of the particulate filter with a platinum catalyst in the region located further downstream provides optimum properties in terms of resistance to ageing and sulphur poisoning. The particulate filter retains a good catalytic activity over its entire service life and can completely convert the large quantities of carbon monoxide and hydrocarbons produced, for example, during an post-injection while generating heat.

However, it is not only the precious metals which are responsible for the catalytic activity of the catalytic coating, but rather the support materials used also play an important role in this context. The support materials of the first and second catalyst may be identical or different. They are preferably selected from a group of support materials which consists of aluminium oxide, silicon dioxide, titanium oxide, zirconium oxide, cerium oxide and mixtures or mixed oxides thereof.

These materials can be thermally stabilized by doping with rare earth oxides, alkaline-earth metal oxides or silicon dioxide. By way of example, it is preferable for active aluminium oxide to be stabilized by doping with barium oxide, lanthanum oxide or silicon dioxide, with the doping elements being present in a concentration of 1 to 40% by weight, calculated as oxide and based on the total weight of the stabilized aluminium oxide. If the support material used is to be cerium oxide, on account of its oxygen-storing properties, it is advantageous to use a cerium/zirconium mixed oxide rather than a pure cerium oxide. Cerium/zirconium mixed oxides generally have a higher thermal stability than cerium oxide alone. This stability can be improved still further by doping the material with, for example, praseodymium oxide.

The weight ratio of palladium to platinum in the first catalyst is advantageously between 10:1 and 1:50. The weight ratio of palladium to platinum in the second catalyst is lower than the corresponding weight ratio in the first catalyst. In a preferred embodiment, the second catalyst does not contain any palladium.

The weight ratio of palladium to platinum, taken as a mean value across the entire particulate filter, is preferably in the range between 1:1 and 1:50, particularly preferably in the range between 1:6 and 1:50.

The first and second catalysts may overlap one another. In the most extreme circumstances, this overlap may even be complete, i.e. the second catalyst is applied uniformly over the entire length of the particulate filter, and the first catalyst is deposited on this second catalyst over a fraction of the length of the filter substrate, starting from the first end face. In this case, the first catalyst can be regarded as comprising two coatings one on top of the other, of which the first, lower layer is of the same composition as the second catalyst.

DETAILED DESCRIPTION OF THE PREFERRED EMBODIMENTS

Figure 1:
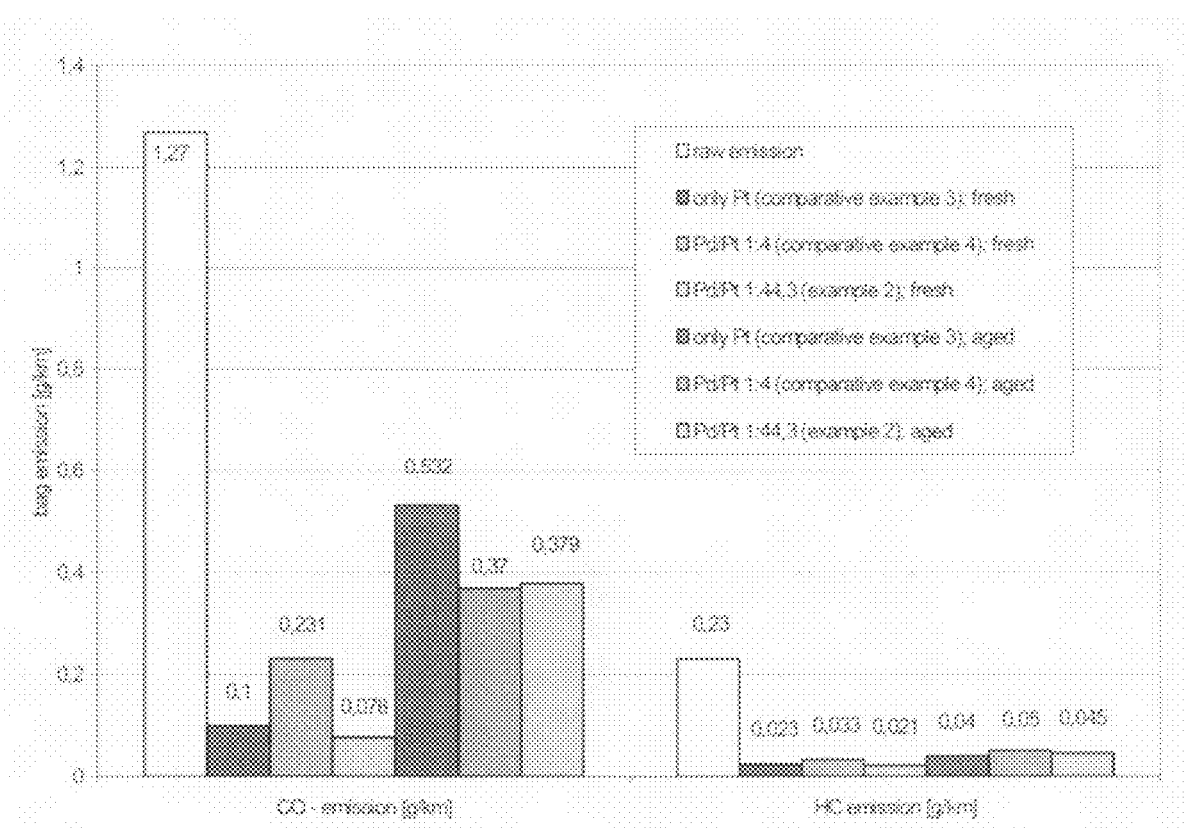
FIG. 1 shows the bag emission in the NEDC test cycle for the filters of the Comparative Examples 3 and 4 and Example 2 in the fresh state and after hydrothermal ageing.

In one particular embodiment, the first and second catalysts may be applied to a third catalyst which is present as a coating over the entire length of the particulate filter.

All known filter substrates can be used for the particulate filter according to the invention. It is preferable to use wall-flow filters which are produced from a ceramic material, such as silicon carbide, cordierite, aluminium titanate or mullite.

Wall-flow filters are generally cylindrical in form, with two end faces and a lateral surface, and have a multiplicity of flow channels for the exhaust gases from the diesel engines passing through them from the first end face to the second end face substantially parallel to the cylinder axis. The cross-sectional shape of the wall-flow filters depends on the installation requirements at the motor vehicle. Filter bodies which are round, elliptical or triangular in cross section are in widespread use. The flow channels are generally square or hexagonal in cross section and are arranged in a dense pattern over the entire cross section of the filter bodies. Depending on the particular application, the channel or cell density of the flow channels varies between 10 and 140 $cm^{-2}$. The thickness of the channel walls between two adjacent flow channels is typically from 0.1 to 0.3 mm, depending on the cell density.

To form the filter action, the flow channels are alternatingly plugged at the first end face and at the second end face. In accordance with the arrangement of the filter in the exhaust stream from the diesel engine, one end face forms the entry end face and the second end face forms the exit end face for the exhaust gas. The flow channels which are open at the inlet side form the inlet channels, and the flow channels which are open at the outlet side form the outlet channels. Inlet and outlet channels are alternately adjacent and are separated from one another by the channel walls between them.

As it passes through the filter, the exhaust gas has to change over from the inlet channels into the outlet channels of the filter through the walls between inlet and outlet channels. For this purpose, the material from which the wall-flow filters are constructed has an open porosity. It is preferable to use wall-flow filters with a porosity of between 30 and 95% and pores with a mean diameter of between 10 and 50 μm. The porosity is preferably between 45 and 90%. By contrast, the porosity of conventional, ceramic flow-through honeycomb bodies, at approximately 30%, is at the lower end of the porosity range of wall-flow filters. The difference is even clearer in the case of the mean pore diameter, which in the case of conventional flow-through honeycomb bodies is only approximately 4 to 5 μm.

The catalyst coatings are preferably substantially present within the pores of the particulate filter substrate. This keeps the increase in the exhaust-gas backpressure caused by the coating as low as possible.

The catalyst materials can be introduced into the pores in the filter material in various forms:

in the form of solid powder materials as sols as solutions of precursors of the subsequent support materials, which are only converted into their final form by a final calcining operation.

In the first case, the powder materials are, for example, slurried in water and milled in order to be homogenized. The milling is carried out in such a way that the maximum size of the support particles in the slurry is less than 10 μm. Experience has shown that this criterion is satisfied to a sufficient extent if the mean particle size $d_{50}$ is reduced to less than 2 μm by the milling operation. Experience has shown that the corresponding $d_{90}$ diameter is then less than 5 μm. In this context, the term $d_{50}$ ($d_{90}$) means that the volume of the particles with particle sizes of below $d_{50}$ ($d_{90}$) cumulatively amounts to 50% (90%) of the volume of all the particles. This small particle size ensures that the support materials are almost exclusively deposited in the pores in the filter material. The support materials may in this case already have been activated with platinum and/or palladium. However, the activation may also take place after the support materials have been applied to the filter substrate, by subsequent impregnation with soluble precursors of the precious metals. These precursors are then converted into their catalytically active form by means of the final drying and calcining of the filter.

The support materials may also be produced in the form of a sol. A sol comprises pre-shaped particles with particle diameters of less than 1 μm, generally even less than 0.5 μm. The techniques used to produce a certain substance in the form of a sol are known to the person skilled in the art. On account of their small particle diameters, these materials are also deposited almost exclusively within the pores during the coating of the filter substrates. As was also the case when using powder materials, the sols may be activated with platinum and/or palladium prior to the coating operation. Alternatively, in this case too the activation may take place only after application of the support materials, by impregnation with soluble precursors of the precious metals.

A third possible option for introducing the catalyst materials into the pores in the filter material is for the filter to be impregnated with a common solution of precursors of the support materials and of the catalytically active precious metals. The subsequent drying and calcining converts these precursors into the final catalyst materials.

The increased palladium level on the incoming flow side can then be produced by impregnation with suitable precursors of palladium or by means of a second coating with a catalyst material containing palladium, in which case the first coating is at least dried prior to application of the second coating.

Figure 2:
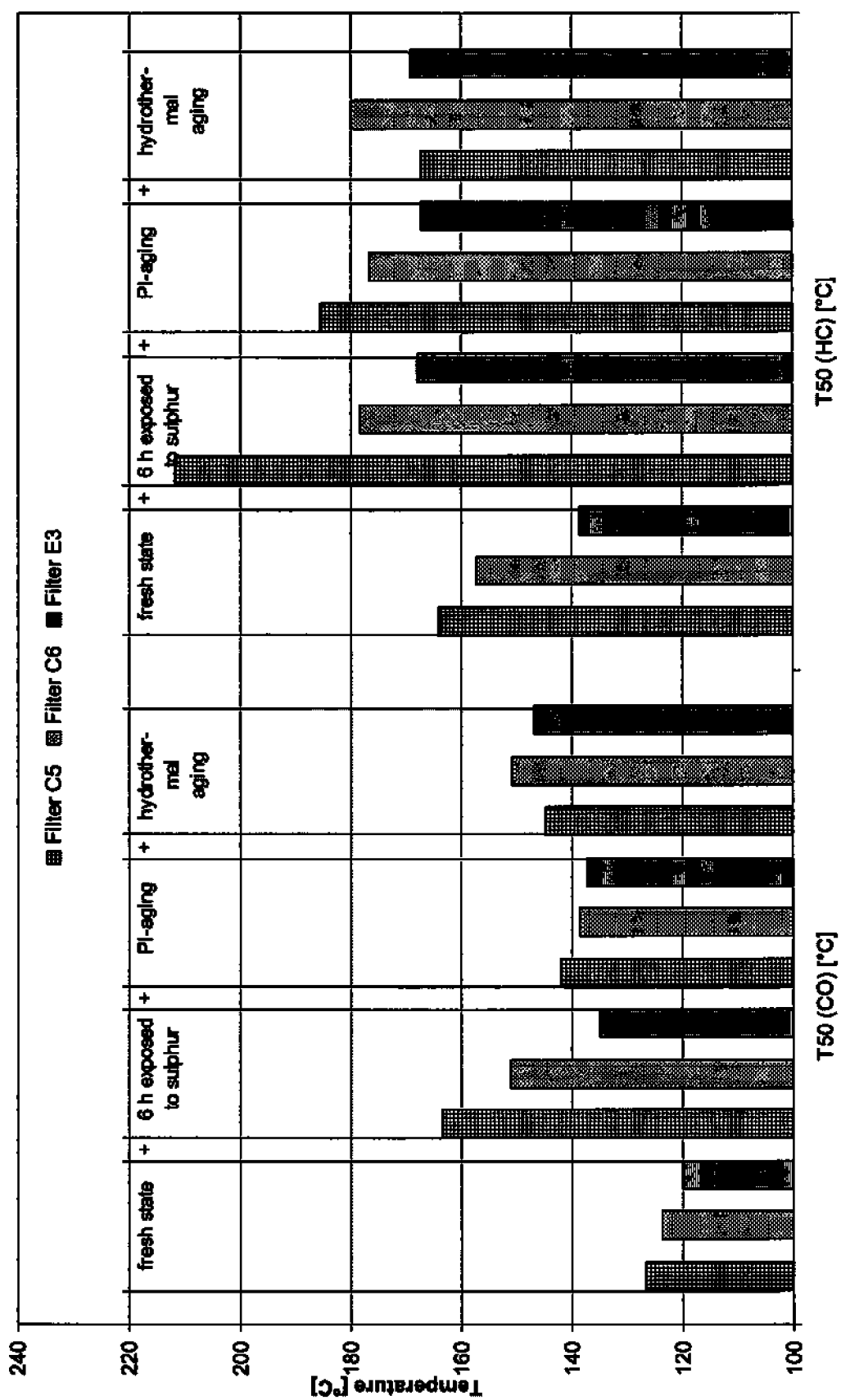
FIG. 2 shows the light-off temperatures for carbon monoxide (CO) and hydrocarbons (HC) for three different filter coatings as the ageing increases.

The following examples and comparative examples together with FIGS. 1 and 2 are intended to provide further explanation of the invention, in which FIG. 1 shows the bag emission in the NEDC test cycle for the filters of the Comparative Examples 3 and 4 and Example 2 in the fresh state and after hydrothermal ageing, FIG. 2 shows the light-off temperatures for carbon monoxide (CO) and hydrocarbons (HC) for three different filter coatings as the ageing increases.

A plurality of diesel particulate filters with different coatings were produced, and their light-off temperatures for the conversion of carbon monoxide and hydrocarbons were determined in the fresh and aged states. The ageing of the coated filters was carried out at 750° C. in air with a water vapour content of 10% by volume for a period of 16 hours (hydrothermal ageing).

The particulate filter substrates are in each case filter bodies made from silicon carbide with a cell density of 46.5 $cm^{-1}$ (300 cpsi) and a thickness of the passage walls of 0.3 mm (12 mil). The filter material had a porosity of 60% with a mean pore diameter of 30 μm.

Three filter substrates with dimensions 25.4×25.4×152.4 mm (1"×1"×6") were used for Comparative Examples 1 and 2 and for Example 1 and were measured after coating in a model gas installation.

Comparative Example 1

Filter C1

The first filter substrate was coated with a platinum catalyst supported on a stabilized γ-aluminium oxide. For this purpose, the catalyst material was slurried in water and thoroughly milled, so that substantially all the catalyst particles had diameters of less than 10 μm. The $d_{90}$ diameter of the catalyst particles was less than 5 μm. For the filter to be coated, it was oriented with its flow passages vertically. Then, the slurry was pumped into the filter through the lower end face. After a short time, excess slurry was sucked out at the bottom. This coating operation caused the slurry to be deposited substantially in the pores in the filter. Then, the filter was dried and calcined at 500° C. for a period of 2 hours. The finished filter had a platinum concentration of 3.18 g/l (90 g/ft$^3$).

Comparative Example 2

Filter C2

The second filter substrate was coated in a similar way with a palladium/platinum catalyst supported on stabilized γ-aluminium oxide. The palladium/platinum catalyst had a palladium/platinum ratio of 1:4. The total precious metal loading was likewise 3.18 g/l (90 g/ft$^3$).

Example 1

Filter E1

To produce a filter according to the invention, the third filter substrate was first of all uniformly coated over its entire length with a platinum catalyst in the same way as in Comparative Example 1. However, the platinum loading was reduced compared to filter C1, to a level of 3.1 g/l (88 g/ft$^3$). Then, to form the first catalyst, what would subsequently be the gas inlet side of the filter was impregnated further over a length of 25.4 mm with 0.42 g/l (12 g/ft$^3$) of palladium using palladium nitrate. The total precious metal content of the filter was therefore likewise 3.18 g/l (90 g/ft$^3$). The first catalyst formed by the further impregnation had a precious metal concentration of 3.53 g/l (100 g/ft$^3$) with a palladium/platinum ratio of 1:7.3. In this case, the second catalyst was formed by the platinum catalyst that had not been impregnated further with palladium. Its palladium/platinum ratio was therefore 0.

The light-off temperatures of these three filters for the conversion of carbon monoxide and hydrocarbons in the fresh and aged states was determined on a model gas installation by subjecting them to a model exhaust gas. The space velocity was 25000 h$^{-1}$. To determine the light-off temperatures, the model exhaust gas was heated at a rate of 15° C./min. The composition of the model exhaust gas used is shown in Table 1:

TABLE 1

Composition of the model exhaust gas for measuring the light-off temperatures

| Exhaust gas component | Concentration |
|---|---|
| CO | 350 ppm by volume |
| $H_2$ | 116 ppm by volume |
| $C_3H_6$ (rel. to C1) | 270 ppm by volume |

TABLE 1-continued

Composition of the model exhaust gas for
measuring the light-off temperatures

| Exhaust gas component | Concentration |
|---|---|
| $SO_2$ | 20 ppm by volume |
| NO | 270 ppm by volume |
| $CO_2$ | 10.7% by volume |
| $H_2O$ | 10% by volume |
| $O_2$ | 6% by volume |
| $N_2$ | remainder |

The measured light-off temperatures for the three filters are given in Table 2.

TABLE 2

| Filter | Pd/Pt | State | $T_{50(CO)}$ [° C.] | $T_{50(HC)}$ [° C.] |
|---|---|---|---|---|
| C1 | 0:1 | fresh | 122 | 131 |
| C2 | 1:4 | fresh | 143 | 147 |
| E1 | 1:44.3 | fresh | 125 | 131 |
| C1 | 0:1 | aged | 189 | 195 |
| C2 | 1:4 | aged | 150 | 161 |
| E1 | 1:44.3 | aged | 156 | 181 |

In the following Comparative Examples 3 and 4 and in Example 2, filter substrates composed of silicon carbide having a diameter of 143.8 mm and a length of 152.4 mm were coated in the same way as the filter substrates of the preceding comparative examples and examples.

Comparative Example 3

Filter C3

The filter substrate was uniformly coated over its entire length with the platinum catalyst of Comparative Example 1. The platinum concentration on the finished filter was 3.18 g/l (90 g/ft$^3$).

Comparative Example 4

Filter C4

The filter substrate was coated uniformly over its entire length with the palladium/platinum catalyst from Comparative Example 2. The palladium/platinum catalyst had a palladium/platinum ratio of 1:4. The total precious metal loading on the filter was 3.18 g/l (90 g/ft$^3$).

Example 2

Filter E2

First of all, the filter substrate was uniformly coated with the platinum catalyst from Comparative Example 1, with a platinum concentration of 3.1 g/l (88 g/ft$^3$). Then, the inlet side of the filter was impregnated further over a length of 25.4 mm with 0.42 g/l (12 g/ft$^3$) of palladium using palladium nitrate. The total precious metal content of the filter was therefore likewise 3.18 g/l (90 g/ft$^3$). The first catalyst formed by the further impregnation had a precious metal concentration of 3.53 g/l (100 g/ft$^3$) with a palladium/platinum ratio of 1:7.3.

The testing of the catalytic activity of these filters in the fresh state and after hydrothermal ageing was carried out on a Euro III certified diesel passenger car with a 100 kW 2.2 l diesel engine with common rail. This vehicle was factory-fitted with an oxidation catalyst and a particulate filter. Instead of the light-off temperatures, the emissions in the NEDC driving cycle were determined on the vehicle. For this purpose, the mass-produced exhaust gas purification system composed of oxidation catalyst and particulate filter was in each case replaced by the coated particulate filter. The results including the untreated emissions from the vehicle are compiled in FIG. 1.

It is clearly apparent that the filter according to the invention in accordance with Example 2 has the fresh activity of the filter equipped only with a Pt/aluminium oxide catalyst (Comparative Example 3) and the ageing stability of the filter uniformly coated with a Pd—Pt/aluminium oxide catalyst (Comparative Example 4).

Example 3

A second set of filters C3, C4 and E2 was produced.

The filters, without a pre-catalyst, were first of all measured in the fresh state for their light-off temperature at a direct-injection diesel engine (2.2 l capacity) with exhaust gas turbo charging and charge air cooling and a power of 100 kW. Then, all the filters were exposed to sulphur for in each case 6 hours at exhaust-gas temperatures between 200 and 300° C. using a diesel fuel containing 2400 ppm by mass of sulphur and then measured again. The results are compiled in Table 3:

TABLE 3

Light-off temperatures at the 2.2 l engine,
fresh and after exposure to sulphur

| Filter | Pd/Pt | State | $T_{50(CO)}$ [° C.] | $T_{50(HC)}$ [° C.] |
|---|---|---|---|---|
| C1 | 0:1 | fresh | n.d. (<120° C.) | 141 |
| C2 | 1:4 | fresh | 133 | 172 |
| E2 | 1:44.3 | fresh | n.d. (<120° C.) | 147 |
| C1 | 0:1 | exposed to sulphur | 142 | 155 |
| C2 | 1:4 | exposed to sulphur | 171 | 223 |
| E2 | 1:44.3 | exposed to sulphur | 148 | 160 |

It is clearly apparent that the filter with the coating comprising only Pt has a similar fresh activity to the filter according to the invention which has been impregnated further with palladium on the inflow side. Filter C2 with a uniform Pd/Pt coating over the length of the filter is very susceptible to sulphur poisoning. The reason for this is the ease with which palladium is poisoned by sulphur. This problem is substantially avoided if, in accordance with the invention, palladium is introduced only in an inflow-side zone of the filter. At the same time, this allows the thermal ageing stability of the coated filter to be improved compared to a pure platinum catalyst.

Comparative Example 5

Filter C5

First of all, a basecoat was applied to a filter body made from silicon carbide with a diameter of 143.8 mm and a length of 152.4 mm (5.66"×6"). This basecoat contained a platinum/palladium catalyst with a palladium/platinum mass ratio of 1:2 supported on a stabilized γ-aluminium oxide. To apply the coating, the catalyst material was slurried in water and thoroughly milled, so that substantially all the catalyst particles had diameters of less than 10 μm. The $d_{90}$ diameter of the catalyst particles was less than 5 μm. The precious metal concentration of this coating was 2.12 g/l (60 g/ft$^3$).

After intermediate drying, a zone with a length of 25.4 mm, starting from the inlet end face, was additionally coated with the same catalyst slurry as used for the basecoat. The precious metal concentration in this zone coating was likewise 2.12 g/l.

Comparative Example 6

Filter C6

A further filter body was provided with a basecoat as in Comparative Example 5.

After intermediate drying, a zone with a length of 25.4 mm starting from the inlet end face was additionally coated with a platinum catalyst supported on a stabilized γ-aluminium oxide. Once again, the catalyst slurry was milled to such an extent that the $d_{90}$ diameter of the catalyst particles after milling amounted to less than 5 μm. A precious metal concentration of 2.12 g/l was set for the zone coating, in the same way as for the basecoat.

Example 4

Filter E3

A third filter coating was first of all coated with a platinum catalyst in accordance with the invention. The milling and coating was carried out as in Comparative Examples 5 and 6 above. The precious metal concentration of this coating was once again 2.12 g/l.

After intermediate drying, a zone with a length of 25.4 mm starting from the inlet end face was additionally coated with a platinum/palladium catalyst supported on a stabilized γ-aluminium oxide from Comparative Example 5.

Use Tests:

The light-off temperatures for CO and HC were determined for the three particulate filters of Comparative Examples 5 and 6 and Example 4, using the vehicle which has already been deployed in Example 2. The particulate filters were measured in the fresh state and in each case after successive, specific ageing conditions. The filters were subjected in succession to the following ageing processes:

- 6 hours of exposure to sulphur in the engine as in Example 3
- Ageing by post-injection with 20 post-injection cycles (PI ageing). Each cycle lasted 12 min. The post-injection was carried out at filter entry temperatures of 450° C. On account of the post-injection, the carbon monoxide content of the exhaust gas was 2500 ppm and the hydrocarbon content was more than 18 000 ppm. As a result of these pollutants being burnt at the filter catalyst, the filter temperature rose to 850° C. over the course of a cycle.
- Hydrothermal furnace ageing at 750° C. in air with a water vapour content of 10% by volume for a period of 16 hours.

After each ageing step, the light-off temperatures of the three filter bodies for the conversion of CO and HC were determined. The data is plotted in the diagram shown in FIG. 2. The results clearly demonstrate that the filter of Example 4 which had been coated in accordance with the invention has a significantly improved sulphur resistance combined with a comparable ageing stability when compared to the filter from Comparative Example 5 with a pure platinum/palladium catalyst.

What is claimed is:

1. Catalytically coated particulate filter having a first end face and a second end face and an axial length L, characterized in that the particulate filter is coated with a first and a second catalyst, wherein the first catalyst is coated over a fraction of axial length L starting from the first end face and contains platinum and palladium on first support materials, and the second catalyst contains platinum or platinum and palladium on second support materials, wherein the weight ratio of palladium to platinum in the first catalyst is between 10:1 and 1:50, and the weight ratio of palladium to platinum in the second catalyst is lower than the corresponding weight ratio in the first catalyst, wherein the particulate filter is a wall-flow filter made from ceramic material, such as silicon carbide, cordierite, aluminium titanate or mullite which has an open-pore structure with a porosity of between 30 and 95% and mean pore diameters of between 10 and 50 μm.

2. Particulate filter according to claim 1, characterized in that the first and second support materials may be identical or different and are selected from the group consisting of aluminum oxide, silicon dioxide, titanium oxide, zirconium oxide and mixtures or mixed oxides thereof.

3. Particulate filter according to claim 1, characterized in that the first and second catalysts overlap one another.

4. Particulate filter according to claim 1, characterized in that the first and second catalysts are applied to a third catalyst which is present as a coating over the entire length of the particulate filter.

5. Particulate filter according to claim 1, characterized in that the first catalyst comprises two coatings one above the other, the lower coating having the same composition as the second catalyst.

6. Particulate filter according to claim 1, characterized in that the total weight ratio of palladium to platinum of the entire particulate filter, is in the range between 1:1 and 1:50.

7. Particulate filter according to claim 6, characterized in that the weight ratio of palladium to platinum of the particulate filter, is in the range between 1:6 and 1:50.

8. Particulate filter according to claim 1, characterized in that the catalyst coatings are substantially present within the pores of the particulate filter.

9. Process for producing a particulate filter according to claim 8, characterized in that the catalysts are introduced over the entire length L into the pores in the particulate filter in the form of a suspension of the support materials activated with platinum and/or palladium, the mean particle diameters of which support materials are less than 2 μm, and an increased level of palladium on the incoming flow side is produced by subsequent impregnation with suitable precursors of palladium or by means of a second coating with a catalyst material containing palladium.

10. Process for producing a particulate filter according to claim 8, characterized in that the catalysts are introduced over the entire length L into the pores in the particulate filter in the form of a suspension of the support materials, the maximum particle size of which is less than 10 μm, and are then catalytically activated with platinum and/or palladium by impregnation with soluble precursors of these precious metals, wherein an increased palladium level on the incoming flow side is produced by subsequent impregnation with suitable precursors of palladium or by means of a second coating with a catalyst material containing palladium.

11. Process for producing a particulate filter according to claim 8, characterized in that the catalysts are introduced over the entire length L into the pores in the particulate filter in the form of a sol of the support materials activated with platinum and/or palladium, the maximum particle size of which support materials is less than 1 μm, wherein an increased palladium level on the incoming flow side is produced by subsequent impregnation with suitable precursors of palladium or by means of a second coating with a catalyst material containing palladium.

12. Process for producing a particulate filter according to claim 8, characterized in that the catalysts are introduced over the entire length L into the pores in the particulate filter in the form of a sol of the support materials, the maximum particle size of which is less than 1 μm, and are then catalytically activated with platinum and/or palladium by impregnation with soluble precursors of these precious metals, wherein an increased palladium level on the incoming flow side is produced by subsequent impregnation with suitable precursors of palladium or by means of a second coating with a catalyst material containing palladium.

13. Process for producing a particulate filter according to claim 8, characterized in that the catalysts are introduced over the entire length L into the pores in the particulate filter by impregnation of the particulate filter with a common solution of precursors of the support materials and of the catalytically active precious metals, and are converted into the final catalyst materials by subsequent drying and calcining, wherein an increased palladium level on the incoming flow side is produced by subsequent impregnation with suitable precursors of palladium or by means of a second coating with a catalyst material containing palladium.

* * * * *